Figures 5, 6:
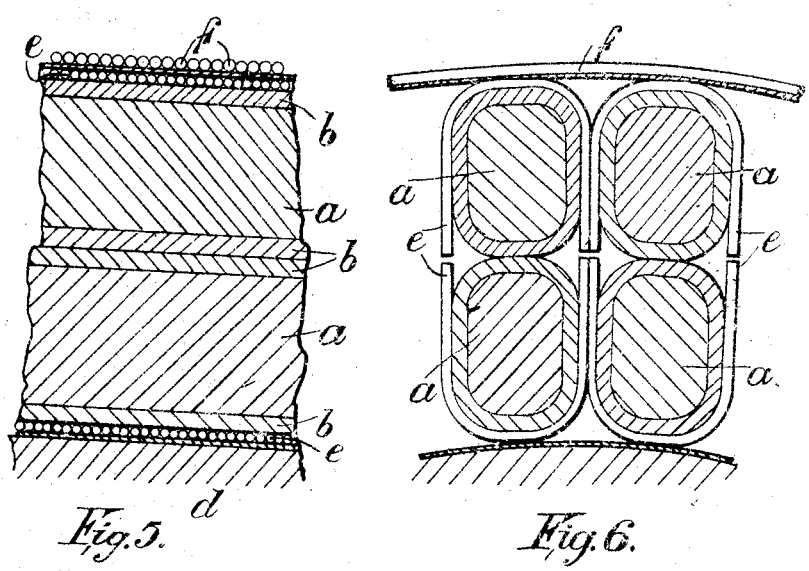

No. 883,822. PATENTED APR. 7, 1908.
C. A. PARSONS.
DYNAMO ELECTRIC MACHINERY.
APPLICATION FILED APR. 23, 1906.
3 SHEETS—SHEET 1.
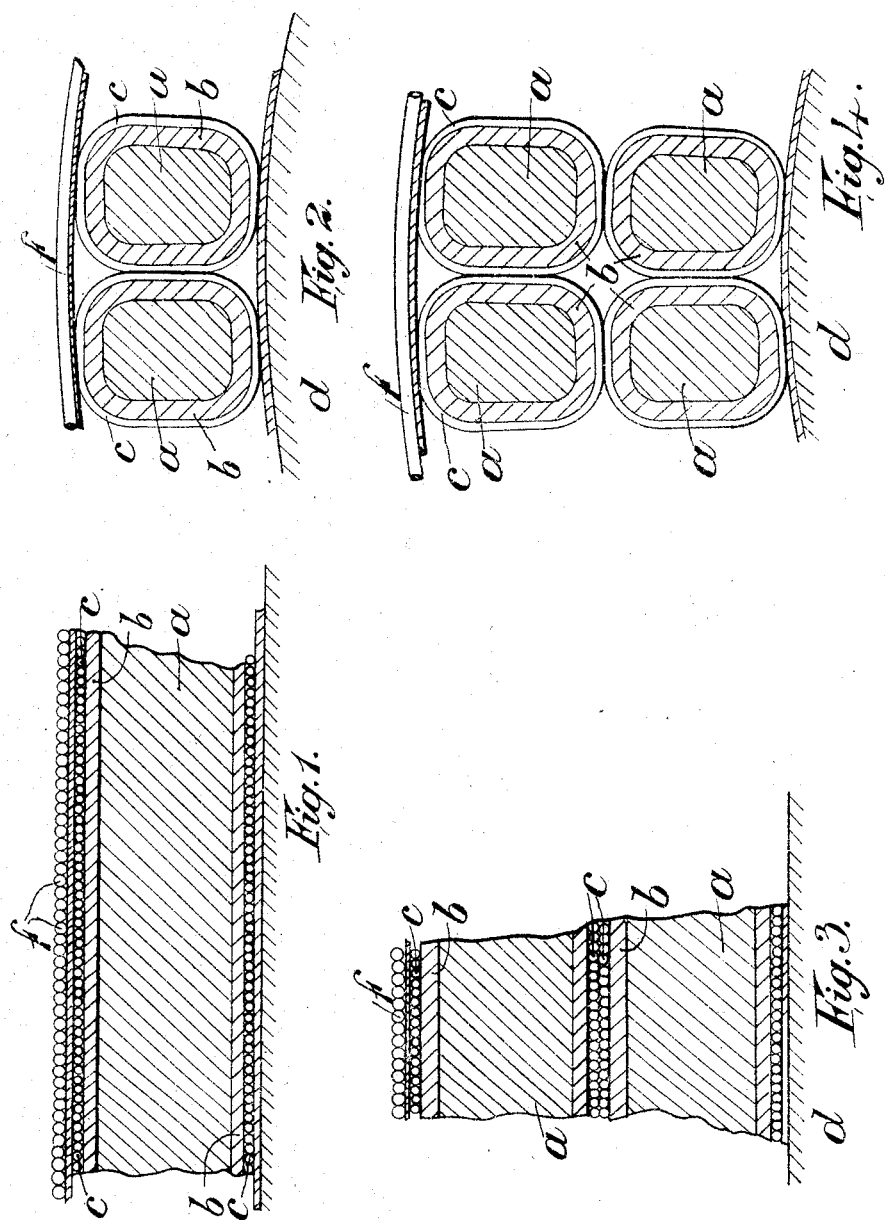

No. 883,822. PATENTED APR. 7, 1908.
C. A. PARSONS.
DYNAMO ELECTRIC MACHINERY.
APPLICATION FILED APR. 23, 1906.

3 SHEETS—SHEET 2.

Attest
Edward T. Reed
Edward N. Santon

Inventor
Charles Algernon Parsons
by Spear, Middleton, Donaldson & Spear
Attys.

No. 883,822. PATENTED APR. 7, 1908.
C. A. PARSONS.
DYNAMO ELECTRIC MACHINERY.
APPLICATION FILED APR. 23, 1906.

3 SHEETS—SHEET 3.

Attest
L. B. Middleton
Edward N. Santon

Inventor
Charles A. Parsons
by Spear, Middleton, Donaldson & Spear
Attys

UNITED STATES PATENT OFFICE.

CHARLES ALGERNON PARSONS, OF NEWCASTLE-UPON-TYNE, ENGLAND.

DYNAMO-ELECTRIC MACHINERY.

No. 883,822.   Specification of Letters Patent.   Patented April 7, 1908.

Application filed April 23, 1906. Serial No. 313,300.

*To all whom it may concern:*

Be it known that I, CHARLES ALGERNON PARSONS, a subject of the King of Great Britain and Ireland, residing at Heaton Works, Newcastle-upon-Tyne, Northumberland, England, have invented new and useful Improvements Relating to Dynamo-Electric Machinery, of which the following is a specification.

This invention relates to electrical appliances and has for its object to facilitate the cooling of the conductors of such appliances.

The invention is applicable to the cooling of any body of conductors especially in the case in which the conductors are large and consist of a number of strands, each insulated with non-conducting covering, such as are used in surface wound armatures of the high speed type, working in conjunction with steam turbines.

The invention consists in providing metal of high thermal conductivity suitably disposed relatively to the conductors whereby the heat is rapidly transmitted from the conductors to the internal parts or the external surface of the part to be cooled and thereby dissipated.

The invention as applied to the armature of a dynamo consists more specifically in placing around on or transversely to the conductor or conductors of the armature a lapping of wires, sheet metal, ribbon, gauze, or the like of high thermal conductivity, the sectional area of such metal being small relatively to the cross section of the conductor but sufficient to conduct the heat rapidly in a radial direction to the internal or external parts of the armature or to both internal and external parts.

The invention consists in providing a heat conducting path to the interior or to the exterior of the part to be cooled, by the use of specially woven tapes containing metal of high thermal conductivity so arranged as to allow of easy dissipation of heat without producing electrically conducting circuits in which eddy currents could be produced.

The invention further consists in forms of tape containing metal of high thermal conductivity especially adapted for the purpose.

The disposition of this heat conducting lapping and the arrangement of the conductors is such that good thermal conductivity is assured between the lapping and the core or external surface or both of the armature, so as to allow of the easy transmission and dissipation of heat and also insulation of the conductors. The sheet metal wire, ribbon or the like is so arranged that it does not produce loss by eddy currents and may be in one continuous winding extending the whole length of the conductor but insulated therefrom, or it may consist of short lengths of spiral lapping or may be made in single loops or U-shaped pieces placed around or by the side of the conductors; or in other cases flat pieces of suitable heat conducting metal may be placed between the conductors, these pieces of metal being in contact with or only lightly insulated from the binding wire or brass end supports of the armature; or projections may be cast or otherwise formed on the end supports to act in a similar manner.

Figure 8:
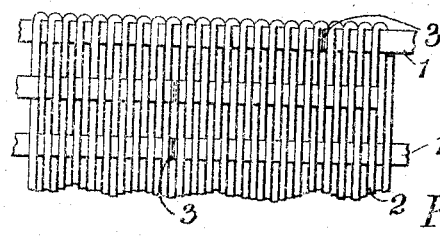
Figure 9:
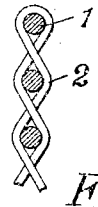
Figure 10:
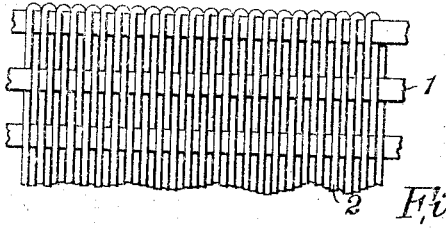
Figure 11:
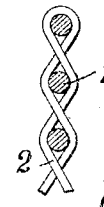
Figure 13:
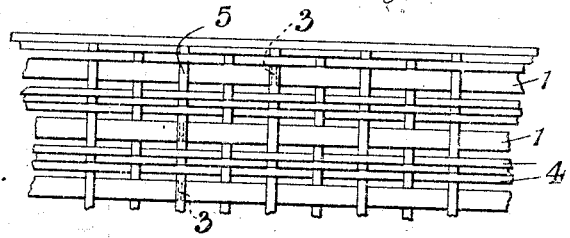
Figure 12:
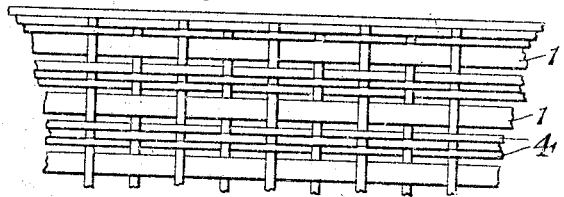
Figure 7:
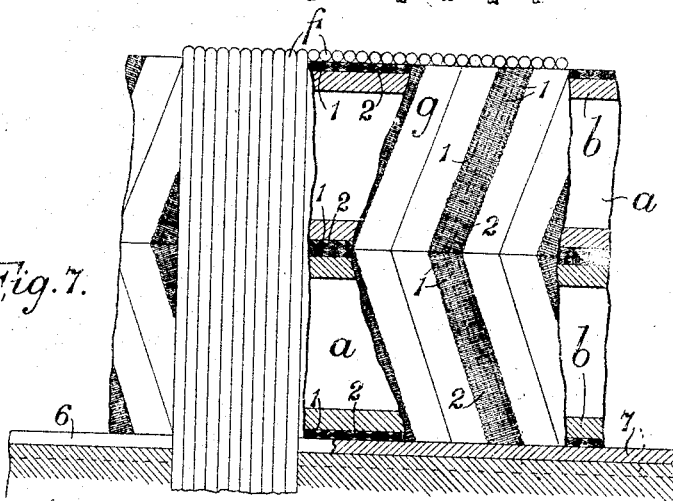

Referring to the accompanying diagrammatic drawings which illustrate the application of the invention to the armature of a dynamo, Figures 1 and 2 are respectively longitudinal and transverse sectionds showing one application of the invention. Figs. 3 and 4 are similar views where the conductors of the armature form a double layer at the end of the core. Figs. 5 and 6 are a longitudinal and a transverse section respectively of another modification. Fig. 7 is an elevation partly in section of another modification. Figs. 8 and 9 are a longitudinal and transverse section respectively of another modification. Figs. 10 and 11 are similar sections of a further modification. Figs. 12 and 13 are longitudinal sections of other forms of my invention.

In the modification shown in Figs. 1 and 2 the armature conductors, $a$, are insulated with cotton or other suitable insulating material.

The outside of the composite conductor which has previously been heavily insulated with cotton or other insulating material, $b$, is lapped with thin copper wire, $c$, the pitch of the lapping being about 1/50 to 1/20th of an inch and preferably in sections about 4″ long with short gaps between them. The conductors $a$, thus lapped lie on the core, $d$, of the armature which has been previously insulated with tape and varnish or in any other suitable way, care being taken that the insulation between the conductors and the core and the conductors and binding wire is not unnecessarily increased and so prevents the easy transfer of heat.

Figs. 3 and 4 show an arrangement for the end windings of an armature when arranged as shown in Figs. 1 and 2, there being in this case two layers of conductors, $a$.

In the modification shown in Figs. 5 and 6 I insert pieces of metal $e$ which may be U-shaped, partially surrounding the conductors $a$, and either insulated or uninsulated from the binding wire, $f$ and body of the armature and from one another.

In the arrangement shown in Fig. 7 the lapping is in the form of a tape, $g$, into which metal 1 is woven longitudinally, the tapes being wound diagonally round the conductors so that the metal in the tapes forms a radial path for heat generated in the conductors.

Instead of the lapping above described, any suitable arrangement of heat conducting metal serving the same purpose may be used; it is found preferable, however, to use specially woven tapes. In forming these tapes according to the form illustrated in Figs. 8 and 9 a tape is woven as warps, metal strips 1 of high thermal conductivity held together by wefts 2 of cotton or other suitable material.

The metal strips forming the warps may be discontinuous in the longitudinal direction the breaks 3 in one strip being opposite continuous parts of the adjacent strips so that the tape is continuous as a fabric but does not afford a continuous electrically conducting path.

According to the modification illustrated in Fig. 12 the metal strips 1 are woven lengthwise in a tape having cotton or like warps 4 held together by wefts 5 which may be small in number and of much finer material so that the copper strips remain practically straight and are bare for nearly the whole of their length and are thus specially suitable for providing a heat conducting path through the points of contact of tapes lapped round adjacent conductors and lying one across the other. In this modification also the metal may be discontinuous longitudinally as shown in Fig. 13 while the tape itself is continuous and the breaks in the metal may be opposite one another or the break in one strip may be opposite the continuous part of adjacent ones.

The metal 1 in the tapes may be in the form of wire of circular as shown in Fig. 9 or other section.

It will be seen that by the use of tapes as above described in which the metal is discontinuous there will be less danger of production of eddy currents than in the case of tapes affording a continuous electrically conducting path throughout their length. Tapes woven with continuous wire as shown in Figs. 19 & 12 may however be used provided they are so placed relatively to the conductors of the part to be cooled as to avoid the formation of closed circuits in which eddy currents might be produced.

If desired as shown in Fig. 7 thin strips of heat conducting metal 7 may be calked in grooves 6 around the core or end rings or other internal or external parts of the appliance to be cooled.

I do not wish to be understood as limiting my invention to the details of construction herein shown and described as I have merely illustrated and described convenient embodiments of my invention, which may be varied widely within the range of ordinary skill without departing from the spirit of my invention.

It will be obvious that the invention is applicable to all forms of electrical machinery in which coils of conductors are liable to heating and that the heat conducting metal above described may be used either alone or in connection with radiating or other cooling appliances whereby the heat led to the surface by the specially provided metal may be dissipated; for instance, on transformers the metal lapping above described may be attached to radiators or project and be cooled by air, water, oil or other fluid circulation in any suitable manner.

I consider any and all such applications of my novel devices and combinations herein set forth to be within the scope of my invention.

By means of the invention much thicker coils can be used than have been heretofore practicable and a greater mass of copper used in a given space, or a greater current density used in a given mass of copper.

Having now particularly described and ascertained the nature of my said invention and in what manner the same is to be performed I declare that what I claim is:—

1. In electrical appliances comprising a number of electric conductors in proximity to each other, means for cooling said conductors, consisting in metal strips lapped round said conductors, and so disposed as to form a heat conducting path from the interior of the body of conductors as and for the purposes described.

2. In electrical appliances comprising a body of electric conductors in proximity to each other means for cooling said conductors comprising discontinuous metal strips of high thermal conductivity lapped round said conductors and in thermal connection with heating dissipating means outside said body of conductors as and for the purposes described.

3. In electrical appliances comprising a number of electrical conductors in proximity to each other, means for cooling said conductors, consisting in metal strips of small section relatively to that of the conductors lapped round said conductors, and so disposed as to form a heat conducting path from the interior of the body of conductors, as and for the purposes described.

4. In electrical appliances, a tape consisting of metal strips of high thermal conductivity woven into a fabric said tape being of high thermal conductivity and electrically discontinuous, as and for the purposes described.

5. In electrical appliances comprising a number of electrical conductors in proximity to each other, a lapping of tape containing strips of metal of high thermal conductivity, interposed between said conductors, as and for the purposes described.

6. In dynamo electric machinery, an armature, including a number of conductors wound on a core, and metal of high thermal conductivity interposed between said conductors as and for the purposes described.

7. In dynamo electric machinery, an armature, including a number of conductors wound on a core, and a lapping of metal of high thermal conductivity interposed between said conductors, as and for the purposes described.

8. In electrical appliances comprising a body of electrical conductors on a core, metal of high thermal conductivity interposed between said conductors and in thermal connection with said core, as and for the purposes described.

9. In electrical appliances, comprising a body of electrical conductors on a core, metal of high thermal conductivity, interposed between said conductors extending to the external surface of the body of conductors, and in thermal connection with said core, as and for the purpose described.

10. In electrical appliances comprising a solid metal body in proximity to a body of electrical conductors, a plurality of strips of metal of high thermal conductivity calked in said solid metal body, and metal of high thermal conductivity interposed between said electrical conductors said metal being in thermal connection with said strips, as and for the purposes described.

11. In electrical appliances a tape consisting of metal strips of high thermal conductivity, woven with other material into a fabric, said metal strips being discontinuous longitudinally while the tape is continuous, as and for the purposes described.

In testimony whereof I have signed my name to this specification in the presence of two subscribing witnesses.

CHARLES ALGERNON PARSONS.

Witnesses:
HENRY GRAHAM DAKYNS, Jr.,
FREDERICK GORDON HAY BEDFORD.